United States Patent [19]
Barkelew

[11] 3,958,792
[45] May 25, 1976

[54] VALVE WITH RADIALLY EXPANSIVE VALVE PLUG

[76] Inventor: Richard C. Barkelew, P.O. Box 1415, Carmel, Calif. 93921

[22] Filed: May 17, 1974

[21] Appl. No.: 470,911

[52] U.S. Cl. .............................. 251/304; 251/318; 137/625.17
[51] Int. Cl.² ......................................... F16K 11/02
[58] Field of Search .......... 251/309, 358, 304, 324, 251/368, 356, 314, 316, 317; 137/375, 625.17

[56] References Cited
UNITED STATES PATENTS

| | | | |
|---|---|---|---|
| 2,225,081 | 12/1940 | O'Hare | 251/358 |
| 2,501,657 | 3/1950 | Barkelew | 137/625.17 |
| 2,634,946 | 4/1953 | Mueller et al. | 251/309 X |
| 2,864,579 | 12/1958 | Stoltenberg | 251/309 |
| 2,961,214 | 11/1960 | Freed | 251/309 |
| 3,314,644 | 4/1967 | Dwyer et al. | 251/309 |
| 3,432,143 | 3/1969 | Johnson | 251/317 |

*Primary Examiner*—William R. Cline
*Attorney, Agent, or Firm*—Forrest J. Lilly

[57] ABSTRACT

A novel cylindrical valve plug for the ported bore in valve, particularly a class of hot and cold water mixing valves, is disclosed. The plug, in an illustrative embodiment, comprises an inner cylindrical core, a non-metallic, yieldable elastic sleeve compressed about the sleeve, and placed under radial compression inside the valve bore, so as to bear and exert pressure radially outward on the inner wall of the valve bore.

A multiplicity of small serrations on the surface of the core penetrate partially (but with non-cutting indentation rather than puncture) into the sleeve when the sleeve is compressed, leaving air pockets in the valleys of the serrations. When, owing to any cause, such as temperature rise, the compression of the sleeve rises, it expands elastically into the "breathing space" afforded by these pockets, instead of increasing the radial pressure between the valve plug and the valve bore, such as would increase the resistance to turning or to axial travel of the valve plug. The plug can compensate not only for increase or reduction in temperature, but also for wear, erosion, corrosion, or dimensional variations.

14 Claims, 10 Drawing Figures

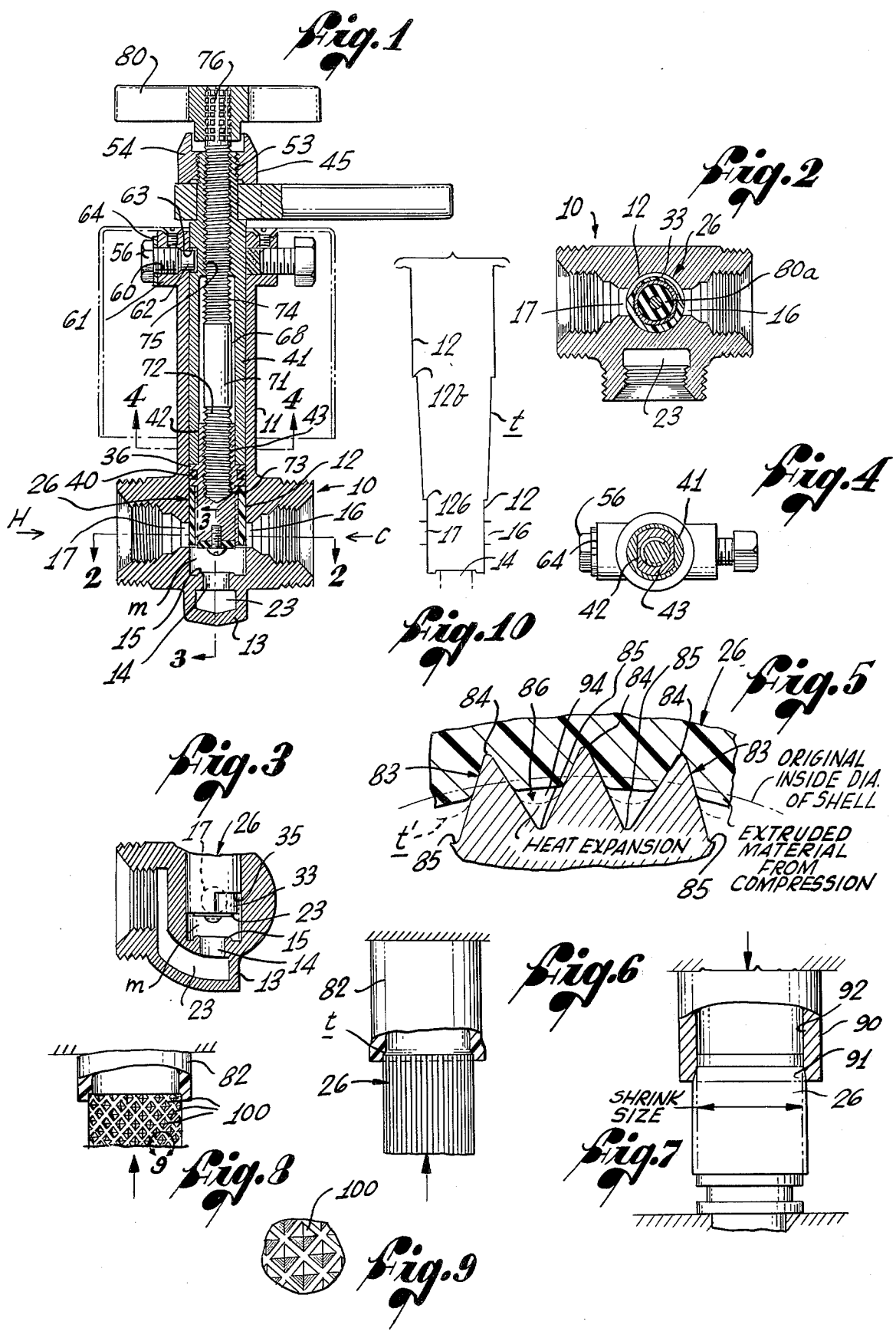

VALVE WITH RADIALLY EXPANSIVE VALVE PLUG

FIELD OF THE INVENTION

This invention relates generally to fluid control valves of the general class having a valve plug rotatable in a cylindrical bore in a ported valve body, and more particularly, and especially in its most important present application, though without implied limitation thereto, to a mixing valve designed to control both the quantity and proportional mixing of two or more fluids.

BACKGROUND OF THE INVENTION

A mixing valve representative of the prior art is shown in my U.S. Pat. No. 2,501,657. In such valves, hot and cold water are admitted into a cylindrical mixing chamber through ports in the sidewall thereof, and the mix and flow quantity are controlled by a cylindrical plug in the chamber, the leakage between the plug and sidewall being limited either by the closeness of the fit between the plug and cylinder, or by seals. Close fits and tolerances, however, not only increase the cost of manufacture, but also increase maintenance as erosion, wear and corrosion begin to occur. Close fits also limit the choice of materials which may be used because of differences in coefficient of thermal expansion.

Assume the cylindrical valve bore and plug of my aforementioned illustrative prior art valve to be vertically oriented, and the plug to be rotatable to register a generally circumferentially extending passage or groove thereof with either one or both of two inlet ports, this passage or groove leading to the mixing chamber, and thence to an outlet port of the mixing chamber. The valve plug is also movable axially from full-open position in which this passage or groove is laterally opposite (in the horizontal plane of) the inlet ports, to a closed position in which its end seals the outlet port, the flow volume through the valve being gradually reduced to zero by this axial travel.

Assume now that the valve plug is closed, by sealing against the outlet. The circumferentially extending passage in the plug is now out of register with the inlet ports. Cold and hot water are present in the inlet ports occasionally at different pressures, and there can be a cross flow of fluid from the port at higher pressure, through the clearance space between the valve plug and the valve bore, to the port at the lower pressure. There is a further sealing problem, in that, with the valve open to flow from just one of the inlets, there can be a small leakage flow from the "closed" inlet around the valve plug to the outlet. These leakage flows can be curtailed to a degree by machining the parts with very small clearance space, but requiring expensive machine work with slight tolerances. Alternatively, seals can be used, but these are likely to be fragile and have not been problem free.

It is accordingly a general purpose of the invention to provide a mixing valve having an improved radially expansive valve plug, which exerts a radially expansive force on the walls of the valve bore, furnishing zero clearance, and maintaining this condition, notwithstanding wear, erosion, corrosion, or temperature fluctuations over a long period of time without leakage or other disorder.

BRIEF DESCRIPTION OF THE INVENTION

The invention provides such a mixing valve with a cylindrical valve plug, composed of an inner core, which may be composed of a suitable metal, such as brass (though a metal is not essential), and which is encased in a cylindrical, nonmetallic, elastically compressible sleeve, of selected coefficient of friction, usually relatively low. It has a fair degree of yieldability (by indentation) to pressure. For example, a hardness such as that of polytetrafluorethylene is satisfactory. The presently preferred material is in general a fluorinated hydrocarbon, and particularly polytetrafluoroethylene (Teflon). This material is elastically deformable under compression, but with a modulus which is quite high. The sleeve is compressed about and keyed to the core; and the resulting cylindrical plug is then installed in an elastically compressed state inside a valve bore. In place in the valve, at room temperature, say 70°, the sleeve is under substantial compression about the plug, and exerts a substantial radial force outwardly on the interior wall surface of the valve bore. In time this force may diminish. Assuming a smooth valve bore, the degree of compression at room temperature, or within a usual working range, (with the sleeve typically compressed by several thousandths of an inch) is such that the force necessary to move the plug in the bore is moderate and desirable. The coefficient of expansion of Teflon, however, in the room temperature range, is greater than that of brass, of which the valve body and the valve core are generally constructed, and with substantial temperature rise, the volume of the sleeve, if it were confined, would tend to become excessive for its space in the valve. Thus, its compression would rise, and so exert increased radial pressure on the surface of the valve bore, causing it to become overly tight therein. According to the present invention, expansion space is distributed internally of the sleeve, for example, at the interface between the sleeve and core, and as temperature rises, for example, the resulting increase in compression, and additional radial pressure between the sleeve valve plug and valve bore is alleviated by expansion into this expansion space.

This sleeve expansion space according to the invention may be provided in various ways. For example, the brass core of the valve may have its external surface provided with fine, closely-spaced outwardly tapering projections, such as teeth, ribs, serrations, rows of tapered diamonds, truncated pyramids, or the like. A form proved successful comprises crossing helically aligned rows of truncated pyramids. The sleeve is radially compressed so as to protrude part way into the spaces or valleys between these projections, leaving expansion pockets in the bottoms of the spaces or valleys between the aforesaid projections. Actually, the projections on the core become indented (in the dictionary meaning of "indent", denoting forcing inward, so as to form a depression, or dent, rather than cutting or puncture) into the yieldable material of the sleeve. A radial compressive force is thus developed in the sleeve, of a magnitude partially determined by the central angle of the slope-sided projections. Such projections have a beneficial centering effect on the sleeve relative to the core. A preferred feature, though not essential, is to compress the sleeve into the valleys of the core to a degree beyond the elastic limit of the sleeve material, so that the material retains a permanent set, and becomes tightly locked to the core. When temperature then rises, for instance, and the material of the elastic sleeve therefore tends to undergo increasing compressive pressure, the portions of the sleeve material already indented down into or partially into the aforementioned valleys, expand, protrude, or indent elastically, or by deformation beyond the elastic limit, still deeper therein, and thus the sleeve enlarges in volume without the undue further compression, with resulting binding that would occur if there were no relief, or if relief had to be afforded at the ends of the sleeve.

BRIEF DESCRIPTION OF THE DRAWINGS

FIG. 1 is a longitudinal medial section of a mixing valve incorporating the improvements of the invention;

FIG. 2 is a transverse section taken on line 2—2 of FIG. 1;

FIG. 3 is a section taken on line 3—3 of FIG. 1;

FIG. 4 is a section taken on line 4—4 of FIG. 1;

FIG. 5 shows a fragmentary portion of FIG. 2 to a much enlarged scale;

FIG. 6 illustrates the step of assembling the valve plug sleeve onto the valve plug core;

FIG. 7 illustrates the step of forcing the valve plug into the bore of a sizing bushing to shrink and compress the elastic valve sleeve on the valve plug;

FIG. 8 is a view similar to a portion of FIG. 6, but showing a modified form of projections used on the valve plug core;

FIG. 9 shows a fragmentary enlargement of FIG. 8; and

FIG. 10 is a largely diagrammatic view of a portion of the valve bore showing with exaggeration its interior profile.

DESCRIPTION OF PREFERRED EMBODIMENTS

Mixture and volume control valves of the type with which the present invention is concerned, are adapted for use in any situation requiring changes in the mixture proportions of two incoming fluids without appreciable variation of the total output volume, or changes in the volume without appreciable change in the mixture proportion. A principal use of such valves, however, is in a shower installation wherein hot and cold water are mixed in proper proportions to give the desired temperature, and where it is desirable to be able to increase or decrease the total volume of water being discharged, or to turn the water on or off entirely without disturbing the mixture proportions. Accordingly, the embodiment selected to illustrate the principles of the invention is one designed primarily for shower or sink installations, but it is to be understood that the invention is in no way limited solely to such use, and might be used to equal advantage in many industrial applications. The illustrative mixing valve to which the improvements of the present invention have been added is shown in my earlier U.S. Pat. No. 2,501,657, to which reference may be had for any details not shown herein. It will of course be understood that many of the details of this earlier valve are not relevant to the present broad invention, and are shown simply to furnish one operative example of a broad class of mixing valves with which the valve plug of the present invention can be combined with improved overall performance.

In the drawings, the representative mixing valve is designated in its entirety by the reference numeral 10, and is seen to comprise a generally cylindrical body 11, preferably composed of brass, having a cylindrical valve bore 12 formed therein. Inasmuch as the drawings show the valve in a vertical position, the following description will refer to the several parts thereof as the top, bottom, etc., although it will be understood that such orientation relates solely to the illustrative drawings. In actuality, for a shower installation, the body 11 of the valve is generally horizontal, projecting outwardly from a shower room wall. With this understanding, the top end of the bore 12 is open, while the bottom end thereof is designated at 13, and is formed with a central, axially extending outlet port 14 having a raised annular seat 15 around its margin. The lower portion of the bore 12, above outlet port 14, constitutes a mixing chamber m.

Intersecting the bore 12 at a short distance above the bottom 13 are two diametrically opposed inlet ports 16 and 17 which open into oppositely extending coupling bosses, connecting the cold water and hot water supply pipes to the valve. The outlet port 14 opens at its bottom end into a passageway 23 which curves upwardly and forwardly therefrom and opens into a forwardly extending coupling boss for connecting the valve to a discharge pipe.

Slidably disposed within bore 12 and also rotatable therein, is the cylindrical valve member or plug 26 of the invention. Secured to the bottom of plug 26 is a sealing washer 31 adapted to bear against the annular seat 15 when the plug 26 is at the lower extremity of its travel, thereby shutting off the flow of water through the outlet port 14.

Formed in the sides of the valve plug 26 at the bottom end thereof are passage means which cooperates with the inlet ports 16, 17 to control the flow of fluid entering the bore 12. These may comprise two angularly spaced flats, as in my U.S. Pat. No. 2,501,657; or the passage means may be otherwise arranged.

Preferably, however, and as here shown, the periphery of the valve plug is cut away at the bottom to form a circumferentially extending groove 33, radially opposite or aligned with the ports 16 and 17 when the valve plug 12 is in the open position of FIGS. 2 and 3. This groove 33 extends throughout an arc of approximately 180° (FIG. 2). It opens downwardly into the mixing chamber m. As the valve cylinder is moved axially upward from its closed position (not shown) seated on seat 15, the groove 33 cracks openings into ports 16 and 17 and then opens these wider and wider until the groove 33 is in full register therewith (FIGS. 1–3). The groove 33 thus provides flow variable channels into the lower portion 12a of bore 12, which thus becomes a mixing chamber below the valve plug, and which leads to outlet port 14. Thus, total flow from the ports 16 and 17 into the chamber 11 is increased from shutoff to maximum as the valve plug is moved axially upward off the seat 15 to the position of FIGS. 1 and 3; and it will be evident from FIG. 2 that the ratio of the flows from ports 16 and 17 will be adjusted as the valve plug is rotated.

At the top edge of the groove 33 is a shoulder 35 which is adapted to cut off the inlet ports 16, 17 when the valve plug 26 is moved downwardly to the bottom of the bore 12. This shoulder 35 closes the ports 16, 17 just before the washer 31 closes against the seat 15 and the inlet ports are thus closed off from one another when the valve is closed, so that, (with the air of sealing means to be described) by-pass of water from one inlet to the other is prevented.

The upper portion of the cylindrical valve plug 26 has two spaced annular flanges, of a diameter a little less than that of the valve plug 26, between which is an annular groove 36, in which is seated an O-ring 40 of rubber or like material. This O-ring seals the clearance between the valve member and the wall of the bore 12 against leakage of water into the upper portion of said bore.

Rotation of the valve plug 26 within the chamber 12 to regulate the mixture proportions of the fluid flow is effected by means of a tubular member 41 which is rotatably disposed within the top portion of the chamber.

The bottom end portion of the tube 41 has a bottom-opening flat-sided bore 42, which telescopically receives a companionate tongue 43 projecting upwardly from the valve member 26. The tube 41, when rotated, thus effects axial, but not rotational, travel of tongue 43 and the valve member 26.

The tube 41 projects above the top end of the valve body 11, and fixedly secured to the projecting end thereof is a mixture control handle 45. The top end portion of the tube projecting above the handle 45 is threaded at 53, and a nut 54 is screwed onto the threads to clamp the handle bar down tightly.

The lower end of the tube 41 forms the upper limit of axial travel of the valve member 26. Thus, tube 41 is held against axial movement within the chamber 12 and is also limited to an angular travel of slightly more than 90°, by means of a limit stop bolt 56 which is screwed into a threaded hole 60 formed in a boss 61 projecting laterally from one side of the valve body 11 at the top end thereof. The threads are relieved from the inner end of the bolt 56, forming a smooth-sided nose 62 which extends into a circumferentially extending slot 63 in the side of the tube 41. The length of the slot 63 is such that its ends are engaged by the nose 62 when the tube and valve members 26 are turned to either extreme position of the latter, as more fully shown in my aforementioned U.S. Pat. No. 2,501,657. A lock washer 64 prevents the bolt 56 from working loose.

Axial movement of the valve member 26 to regulate the volume of flow is obtained by means of a turnbuckle-like arrangement consisting of a stem 71 which extends down through the central opening 68 of the tubular member 41. The bottom end of the stem 71 has a left hand thread 72 formed thereon, and this threaded portion is received within a threaded hole 73 in the valve member 26. The upper portion of the stem 71 has a right hand thread 74 formed thereon, which is engaged by internal threads 74 formed in the upper end of the hole 68.

The stem 71 projects beyond the top end of the tube 41, and its upper end is splined at 76 to receive a volume control handle 78. The volume control handle 78 is coaxial with the mixture control handle 45 and is spaced outwardly therefrom.

The operation of the valve as so far described is believed to be self-evident. The mixture proportions of the incoming hot and cold water (designated by the arrows H and C) is regulated by turning the mixture control handle 45 to one side or the other. When the handle is turned to the left, the cold water port 16 is uncovered, while the hot water port 17 is closed down. When the handle 45 is turned to the right, the hot water port 17 is uncovered and the cold water port 16 is closed down. With the mixture control handle 45 positioned at any desired setting, the volume of flow is regulated by turning the volume control handle 78. When the handle 78 is turned to the right, or clockwise, the right hand threads 74 causes the stem 71 to move downwardly with respect to the tubular member 41, while the left hand threads 72 cause the valve member 26 to move downwardly with respect to the stem 71. Thus, the travel of the valve member 26 is equal to the sum of the movements imparted to it by the right hand threads 74 and the left hand threads 72. The advantage of this arrangement is that the valve plug 26 is advanced twice as fast as it would be if there were only one set of threads of the same pitch.

Note that the two inlet ports 16 and 17 will both be cut off by the shoulder 35 when the valve member 26 is closed on the outlet seat 15. In this way, by-pass or leakage of water from one inlet port to the other is, by the provisions of the present invention, very effectively prevented when the valve is closed, as will appear more fully as the description proceeds.

Attention is now more particularly directed to the cylindrical valve plug 26 of the invention. It comprises a cylindrical body or core 80, having the aforementioned O-ring confining flanges at the top, and the internally threaded socket for the threaded shaft 71 extending downwardly into its upper end. It is encircled, from its lowermost O-ring flange, to its bottom extremity, by a non-metallic elastically compressible shell or sleeve 82.

This elastic sleeve 82 is composed of a material of selected important properties, elasticity, a range of elastic deformation under radially compressive stress, in some cases, an elastic limit, and the ability to extrude or flow beyond its elastic limit with increased stress to take a permanent set, and for some embodiments, a slow recovery time after elastic deformation, i.e., a "memory", relatively low coefficient of friction and good abrasion resistance. The material is yieldable under pressure, with a hardness rating (indentation under pressure) which may satisfactorily be of the order of that of the preferred material, Teflon. I presently prefer for this material a plastics substance of the physical characteristics mentioned, and have discovered commonly known polytetrafluoroethylene, sold under the trademark Teflon, and often called Teflon, to be satisfactory. It has the essential physical characteristics named above, a very low coefficient of friction, and a range of elastic compressive deformation, with a high modulus. It or any equivalent may be used; and whenever the name polytetrafluoroethylene is used, in the specification or the claims, any equivalent is intended to be included as an alternative, to the extent that the essential physical characteristics required by the invention are present. The fluorinated hydrocarbons as a group are representative, but the group member known as Teflon is preferred.

The entire exterior surface of the core 80 is formed with longitudinal serrations 83, having alternating crests 84 and roots 85, defining V-shaped valleys 86. These serrations may run parallel with the axis of the plug, as illustrated, or helically therearound, or otherwise. Many other patterns may be used, but the parallel running serrations will be described first.

The serrated core 80 is initially sized such that the sleeve 82 can be stretched on over it and the assembly, with the sleeve stretched, then inserted in the slightly undersize valve bore. For example, the sleeve may have an initial outside diameter of 0.750 inch. The serrated core is then pressed into the elastic sleeve, stretching it elastically to an outside diameter of 0.785 inch (FIG. 6).

The sleeve 82 is next radially compressed about the core 80, with enough radial compression that the sleeve material is elastically deformed down between the core serrations 83, into the valleys 86, but, in the preferred practice of the invention, not to the bottoms or roots 85 (see FIG. 5) Thus, displacement space in the form of longitudinally extended V-shaped air pockets or grooves 94 is provided. The compressed plug assembly is finally introduced into the slightly undersize valve bore 12.

Alternative procedures according to the invention are available here. For example, a sizing bushing 90, having a convergent entrance throat 91, leading to a bore 92, with an inside diameter of 0.748 inch, is then forced on over the plug 26 consisting of core and slightly expanded sleeve (at 0.785 inch) (FIG. 7). This compresses and shrinks the plug 26 to a diameter of 0.748 inch. The serrations have now become indented substantially into the inside of the deformable yieldable sleeve. The sleeve, depending upon such factors as its elastic limit, temperature, and degree of compression and relative dimensions, may then be in a state of compression and of deformation beyond its elastic limit at this point, and will substantially retain this compression and deformation, or, with variance in the factors involved, it may hold this degree of compression and diameter for at least a few minutes, and may then gradually expand owing to the phenomenon known as "memory". In either case, the valve plug at a diameter of substantially 0.748 inch, is then pressed out of the bushing and into the valve bore, which, for example, may have a predetermined slightly lesser diameter of 0.745 inch to 0.746 inch. In case the sleeve expands after a short waiting interval, this installation step must be taken immediately. Thus, in either case, the sleeve and plug, at substantially 0.748 inch in diameter, is pressed, with an interference fit of two to three thousandths of an inch, into the valve bore whose predetermined diameter is, for the example given, 0.745 inch – 0.746 inch. The valve plug is now in a state of very substantial radial compression in the valve bore, and presses radially outward on the valve bore walls with substantial pressure.

To avoid having to press the valve plug into the valve bore 12 for nearly the full length of said bore under an interference fit condition, the valve bore 12 may have the dimension 0.745 inch – 0.746 inch only up to say the level of the O-ring flange formation, and may have a shoulder 12b at that point, (too small to be illustrated in FIG. 1, but shown in the diagram of FIG. 10) increasing the bore 12 by a few thousandths to ease the fit the rest of the way up. Additionally, or alternatively, there may be advantageously used a small gradual taper at *t*, (FIG. 10), between the upper end of the 0.745 inch – 0.746 inch portion of the bore and the eased or enlarged diameter above. Such a taper gradually compresses the plug to the 0.745 – 0.746 inch diameter.

An alternative procedure in the installation of the valve plug is to compress it in a sizing bushing 90, to a diameter which will have an easy fit in the valve bore, and from which it will recover slowly by the memory process; and then to install it quickly in the valve bore before it has time to regain interference fit size owing to expansion by "memory".

A still further variant is to dispense with the sizing bushing 90, use a long taper *t* in the valve bore 12 which will accept the expanded plug resulting from the step of stretching the sleeve on over the core, and leading at the other end to the 0.745 inch portion of the valve bore 12. The diagram of FIG. 10 also represents the bore 12 for this case, it being desirable, in this case, to use a reasonably long taper. The taper may end at the top at a small shoulder 12b leading to a slightly enlarged bore portion 12'.

My preference is for compressing the sleeve about the core beyond its elastic limit, so it takes a permanent set about the core, and thus becomes very tightly locked thereto. Even without this reassuring feature, however, the sleeve is well secured to the core by the sleeve material elastically deformed into and thus keyed to the serrations on the core.

The valve plug of the invention responds to thermal expansion of the elastic sleeve by reception of some of the bulk of the latter into the air pockets in the bottoms of the grooves between serrations. (See the bulging outline of the thermally expanding sleeve as indicated in dash lines *t'* in FIG. 5). Thus, the compression, and radially outward force exerted on the wall surface of the valve bore is relieved and prevented from excessive increase. This relief effect applies to the valve as a whole, or to a portion of the valve and plug exposed only to very hot or very cold water.

It will be seen that not only compensation for temperature changes is provided for, since the compressed elastic sleeve has the range of cross sectional contraction and expansion necessary to compensate also for wear, erosion, and/or corrosion, as well as manufacturing tolerance, i.e., slight variances in bore diameter from the exact predetermined diameter. The plug thus functions to counteract pressure changes of the plug on the walls of the valve bore, of whatever source, tending to maintain the pressure at or near a predetermined optimum valve. It thus has exceedingly long life. And by restricting the access of the water or liquids being controlled to the wall of the valve cylinder in the area contacted by the plug sleeve when the valve is in the "off" position, corrosion of the cylinder wall is diminished.

Attention is again called to the fact that the degree of expansive force in the valve bore developed by the sleeve of the valve plug increases with the central angle of the serrations. This part of the expansive force can be minimized by tilting the sides of the serrations to be in strictly radial planes. Although an angle is not mandatory on the sides of the serrations, it is desirable to have an angle on the tops of the serrations to maintain uniform deformation of the sleeve into all points of the plug core on compression. With such angles, the resistance to penetration into the valleys between serrations progressively increases with depth of penetration, so if the penetration in one local region becomes deeper than on the opposite side, it is retarded by meeting locally increased resistance to penetration, and there is thus an equalizing factor that leads to self-centering. It is of course to be noted that the force required to press the sleeve into V-shaped cavities increases not only with the angle of the V, but also as indentation progresses. Penetration tends to be shallower but of good uniformity with substantial V-angles. A substitute for serrations, if the V-angles were dispensed with, would be a multiplicity of small holes drilled radially into the core; or in another case, a plurality of pins extending radially from the core.

The core need not be composed of metal, but could be molded, for example, of a plastic, with the serrations molded on the outside thereof.

FIGS. 8 and 9 show a preferred form of valve plug in which the core has projections in the form of oppositely turning helical rows of pyramids 100.

Other equivalent forms may be used. In fact, any expansion space area or conformation located inside the exterior cylindrical surface of the elastic sleeve is within the scope of the invention, including, for example, bubbles inside the confines of a sleeve composed of molded rubber.

A possible modification is to split the cylindrical plug sleeve longitudinally. A cylindrical plug sleeve longitudinally split is within the scope of the invention.

I have found it useful, in some cases, to have the elastic sleeve heated to an extent during radial compression onto the core, as it then may flow plastically to conform closely to the serrations.

It will be seen that the valve plug of the invention better maintains the seals required in a mixing valve, adequately described hereinabove, through changing conditions of temperature, wear, erosion or corrosion, and maintains at a reasonable value its resistance to either rotative or axial travel for all such variables. Moreover, these qualities are maintained over a long life.

The invention should be fully understood from the foregoing specification and the drawings, which show several present exemplifications thereof. Many further modifications and improvements can of course be made within the scope of the invention as defined in the accompanying claims.

I claim:

1. A cylindrical valve plug for use in the ported bore of a valve, comprising:
   a cylindrical valve core, and an elastic non-metallic sleeve non-rotatably compressed thereon, said sleeve and core being confined under radial elastic compression in said valve bore, and having a range of radial elastic deformation in response to variations in external compressive pressure,
   the inner surface of said elastic sleeve and the exterior surface of said core having interlocking formations affording a multiplicity of pockets therebetween into which portions of the elastic sleeve are partially elastically displaced by elastic compression of the sleeve about the core, said pockets affording added space for additional displacement of sleeve material into said space through a fluctuating range of increasing temperatures, and also affording accommodation for a range of bore diameter variances from said predetermined diameter.

2. A cylindrical valve plug for use in the ported bore of a valve, comprising:
   a cylindrical valve core, and an elastic non-metallic sleeve non-rotatably compressed thereon, said sleeve and core being confined under radial elastic compression in said valve bore, and having a range of radial elastic deformation in response to variations in external compressive pressure,
   said sleeve having, between its outer surface and said core, a multiplicity of pockets affording variable displacement space enabling elastic deformation of the sleeve into said pockets as compression of the sleeve changes with ambient temperature, and also affording accommodation for a range of bore diameter variances from said predetermined diameter.

3. For use in a valve having a cylindrical, ported, valve bore conforming substantially to a predetermined diameter, a cylindrical valve plug rotatable in said valve bore cooperable with the ports therein, comprised of:
   a cylindrical core, and a non-metallic encircling elastic sleeve non-rotatably fitted on said core, said assembly of core and sleeve being under radial elastic compression in said valve bore, and
   means within the assembly of core and sleeve affording distributed expansion space to accommodate a range of radial elastic compression and expansion of the sleeve in response to changes in ambient temperature in the valve, and in compensation of variances in valve bore diameter from said predetermined diameter.

4. The subject matter of claim 3, wherein said sleeve is set in a state of compression beyond the elastic limit of the material of the sleeve.

5. The subject matter of claim 3, wherein said expansion affording means includes expansion spaces distributed substantially throughout the interface region between the core and sleeve and into which portions of the elastic sleeve material may intrude or retract upon change in compressive pressure on the sleeve accompanying ambient temperature change in service, or dimensional variances of the valve bore from its predetermined diameter.

6. The subject matter of claim 5, wherein said sleeve is composed of a plastics material.

7. The subject matter of claim 5, wherein said expansion spaces are formed in the exterior wall of said core, and said sleeve material normally protrudes partially but not wholly into said spaces.

8. A cylindrical valve plug for use in the ported bore of a valve, comprising:
   a cylindrical valve core, and an elastic non-metallic sleeve non-rotatably compressed thereon, said sleeve and core being confined under radial elastic compression in said valve bore, and having a range of elastic deformation in response to variations in external compressive pressure, said core having a surface configuration comprised of a pattern of peaks and valleys therebetween, said sleeve being normally radially compressed within said valve bore to penetrate partially into said valleys at a given ambient temperature, and being elastically compressible more deeply into said valleys in response to increased compressive pressure with rise in ambient temperature.

9. The subject matter of claim 8, wherein said peaks and valleys have sloping, radially outwardly diverging sides.

10. The subject matter of claim 9, wherein said radially diverging peaks and valleys are of substantially V-shape.

11. The subject matter of claim 10, wherein said surface configuration comprises double reverse rows of truncated pyramids.

12. The subject matter of claim 8, wherein said sleeve is composed of a plastics material.

13. The subject matter of claim 8, wherein said sleeve is composed of polytetrafluoroethylene.

14. A valve having a cylindrical, ported valve bore conforming substantially to a predetermined diameter,
   a cylindrical valve core, and an elastic non-metallic sleeve non-rotatably compressed thereon, said sleeve and core being confined under radial elastic compression in said valve bore, and having a range of elastic deformation in response to variations in external compressive pressure, said core having a surface configuration comprised of a pattern of peaks and valleys therebetween, said sleeve being normally radially compressed within said valve bore to penetrate partially into said valleys at a given ambient temperature, and being elastically compressible more deeply into said valleys in response to increased compressive pressure with rise in ambient temperature.

* * * * *